United States Patent
Orooji

(10) Patent No.: US 10,121,185 B1
(45) Date of Patent: Nov. 6, 2018

(54) CONVEYANCE OF VIRTUAL PROPERTIES WITH TRANSFER OF PHYSICAL GOODS

(71) Applicant: Amazon Technologies, Inc., Seattle, WA (US)

(72) Inventor: Tina Ram Orooji, Aliso Viejo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 851 days.

(21) Appl. No.: 14/562,376

(22) Filed: Dec. 5, 2014

(51) Int. Cl.
  *G06Q 30/00* (2012.01)
  *G06Q 30/06* (2012.01)
  *G06K 7/10* (2006.01)

(52) U.S. Cl.
  CPC ..... *G06Q 30/0641* (2013.01); *G06K 7/10366* (2013.01)

(58) Field of Classification Search
  CPC .................................................. G06Q 30/00
  See application file for complete search history.

(56) References Cited

U.S. PATENT DOCUMENTS

| | | | | |
|---|---|---|---|---|
| 9,173,066 B1* | 10/2015 | Jain | ........... | H04W 4/027 |
| 2004/0088231 A1* | 5/2004 | Davis, Jr. | ........... | G06Q 10/087 |
| | | | | 705/28 |
| 2010/0011359 A1* | 1/2010 | Shuster | ........... | G06Q 20/10 |
| | | | | 718/1 |
| 2014/0173638 A1* | 6/2014 | Anderson | ........... | G09B 5/062 |
| | | | | 719/320 |
| 2014/0183257 A1* | 7/2014 | Grossman | ........... | G06Q 20/20 |
| | | | | 235/380 |
| 2015/0088717 A1* | 3/2015 | Votaw | ........... | G06Q 50/01 |
| | | | | 705/35 |
| 2015/0134552 A1* | 5/2015 | Engels | ........... | G06Q 30/0185 |
| | | | | 705/318 |
| 2016/0086249 A1* | 3/2016 | Zamer | ........... | G06O 30/0631 |
| | | | | 705/26.7 |

OTHER PUBLICATIONS

Xie, Lei, "Continuous Scanning with Mobile Reader in RFID Systems: an Experimental Study", State Key Laboratory of Novel Software Technology, Nanjing University, China ‡College of William and Mary, Williamsburg, VA, USA, dated Jul. 29, 2013 (Year: 2013).*

* cited by examiner

*Primary Examiner* — Mark A Fadok
(74) *Attorney, Agent, or Firm* — Baker & Hostetler LLP

(57) ABSTRACT

A physical item with an affixed identification tag may be distributed to a user of a mobile computing device with an included reader device capable of reading an identifier stored on the identification tag. An association between the physical item and the identifier may be stored. When the mobile computing device is brought into proximity with the tagged physical item, a further association between user and identifier may be stored. The user's mobile computing device may be caused to display a digital application store user interface customized based on associations between the identifier, the physical item, and the user.

20 Claims, 9 Drawing Sheets

(side view)
250 physical item
254

(top-down view)
252

CONVEYANCE OF VIRTUAL PROPERTIES WITH TRANSFER OF PHYSICAL GOODS

BACKGROUND

Radio-frequency identification ("RFID") tags may be used to identify and track objects to which the tags are affixed. An RFID tag may work on a principle of electromagnetic induction, allowing the tags to be compact as well as, in at least some cases, eliminating the need for a battery to power the RFID tag. A serial number or other identifier may be stored on the tag. The identifier may be subsequently retrieved by bringing the tag and a reader device in relatively close proximity. RFID tags are used in a variety of circumstances, including those related to inventory tracking, identification of lost animals, and other purposes.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

Radio-frequency identification ("RFID") tags may be used to identify and track objects to which the tags are affixed. An RFID tag may work on a principle of electromagnetic induction, allowing the tags to be compact as well as, in at least some cases, eliminating the need for a battery to power the RFID tag. A serial number or other identifier may be stored on the tag. The identifier may be subsequently retrieved by bringing the tag and a reader device in relatively close proximity. RFID tags are used in a variety of circumstances, including those related to inventory tracking, identification of lost animals, and other purposes.

DETAILED DESCRIPTION

Figure 1:
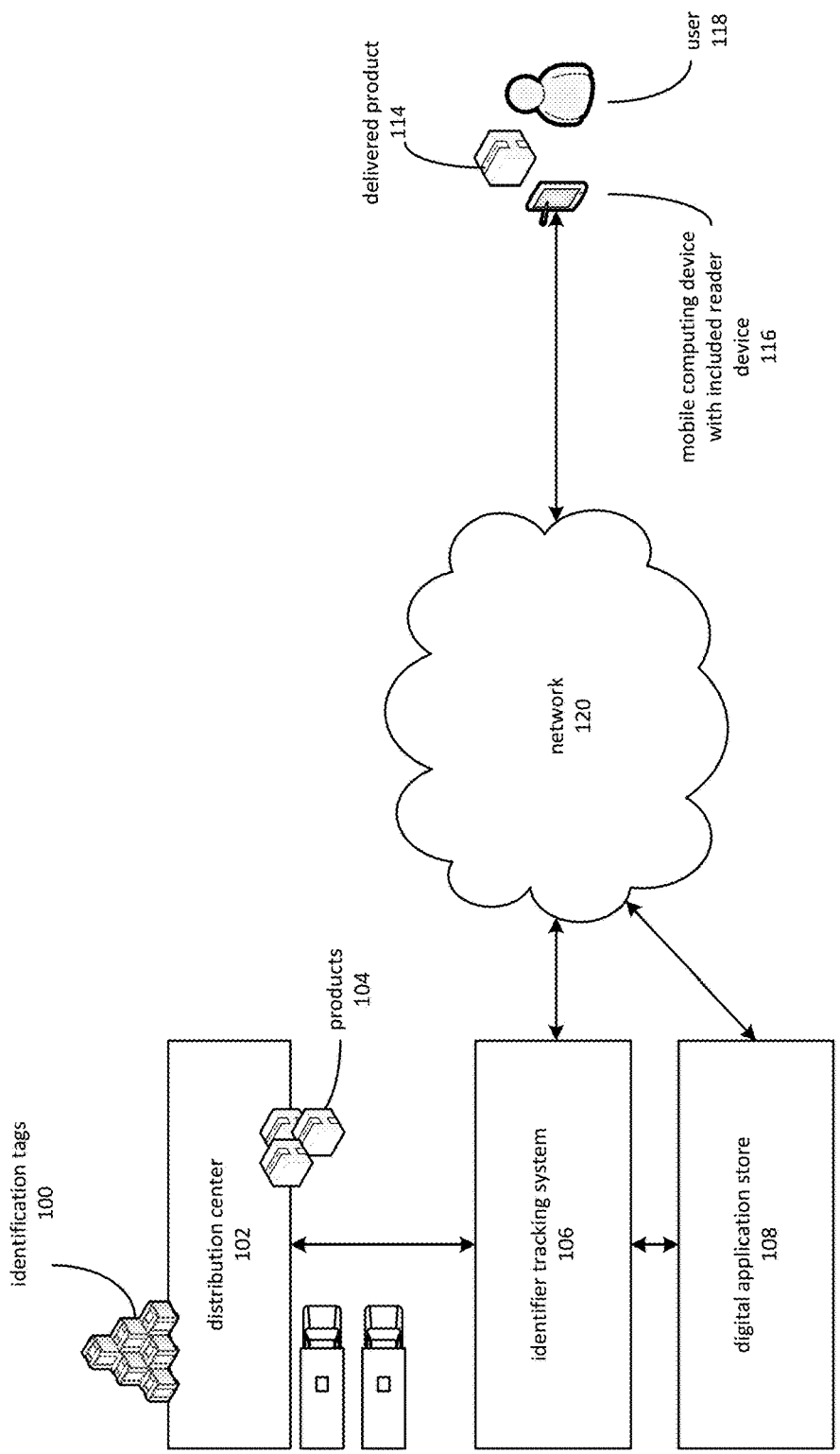
FIG. 1 is a block diagram depicting aspects of a system and method for customizing a digital application store based on physical goods received by a user.

Aspects of the present disclosure may be employed to associate physical items with virtual items and to customize a digital application store experience based on the associations. In various cases and embodiments, user experiences associated with the digital application store and applications acquired through the store may be transferred from one user to another based on the transfer of a physical item. Retailers and other distributors of physical items may integrate distribution of tagged physical items to further customize a digital application store experience.

In an embodiment, a system for linking a physical item to a digital application store may comprise a mechanism that, when activated, causes an identification tag, such as an RFID tag, to be affixed to the physical item. The identification tag may have stored within it an identifier that may be read when the identification device is in proximity to a reader device. The reader device may be contained in a mobile computing device, such as a smartphone or table.

The system may further comprise one or more memories having stored thereon computer-readable instructions that, upon execution by a computing device, cause the system to perform operations that may comprise storing an association between the identifier and the physical item. The association may be stored when the system determines to ship the physical item, or when the system receives information that indicates the physical item is to be shipped.

The system may further, by the execution of instructions stored on the one or more memories, receive data indicating that the identifier has been read by a reader device included in a mobile computing device. The data may comprise the identifier and information describing the user of the mobile computing device. The system may then store information describing an association between the user, the identifier, and the physical item.

The system may further, by the execution of instructions stored on the one or more memories, cause the user's mobile computing device to display a user interface of the digital application store. The system may, for example, transmit rendering instructions for the digital application store to the user's mobile computing device. The user interface may be customized to reflect the relationship between the physical item and the user. The customization may be based partly on the association between the identifier, the physical item, and the user.

A digital application store may authorize the user of certain applications in response to receiving information describing the association between a physical item and an identifier. In an embodiment, a digital application store may grant additional rights to a user in response to receiving the information describing the association between a physical item and an identifier. For example, a digital application store might award credits based on the association.

In an embodiment, the system may receive additional data indicating that the identifier has been read by a reader device included in an additional mobile computing device operated by an additional user. The association between the identifier and the additional user may be handled as a transfer of the physical item from the first user to the second user. In various cases and embodiments, the transfer may cause various assets or features related to a user's experience with a digital application to be transferred from one user to another, when a physical transfer of an item with an embedded identification tag occurs.

In an embodiment, a system may store information indicative of a relationship between an identifier and a recipient of a physical item having an affixed identification tag. The recipient might, for example, be a retailer who receives a bulk shipment of physical items, each of which might have an attached identification tag. When a user brings his or her mobile computing device, with included identification tag reader, into proximity with one of the physical items, the system may utilize the stored information to further customize the user interface. The customization may be based on the recipient of the physical item, e.g., the retailer, as well as the user who purchased the item and caused its identification tag to be read through the use of a mobile computing device. Accordingly, the user interface in such cases may be customized based on associations between the user, the identifier, and the physical item.

FIG. 1 is a block diagram depicting aspects of a system and method for customizing a digital application store based on physical goods received by a user.

Orders for products may be received at and processed by a distribution center 102. A distribution center might include facilities operated to receive orders for physical goods to be shipped to wholesalers, retailers, consumers, and so forth. Various warehouse facilities may be maintained by distribution center 102.

Distribution center 102 may maintain an inventory of identification tags 100. An identification tag may have stored thereon an identifier (not shown), such as a serial number, that uniquely identifies the tag. The identifier may be read by various devices, which may be referred to as reader devices.

In an embodiment, identification tags 100 may comprise radio-frequency identification tags. A radio-frequency identification tag may operate, for example, on a principle of electromagnetic induction, so that when exposed to electromagnetic energy it transmits an identification code stored within it.

A distribution center 102 may maintain an inventory, which might include product 104. Prior to or upon a determination to ship one or more of products 104, a mechanism or process may operate at distribution center 102 to cause one or more identification tags 100 to be affixed to the one or more products 104.

A reader device (not shown) may be operated at distribution center 102 to retrieve identifiers stored on identification tags 100, which may be affixed to one or more products 104.

In some cases, bulk association may be utilized. This may comprise a reader device that reads identifiers associated with a number of identification tags in one read operation. The plurality of identifiers read in this way may then be associated with a plurality of products. Identifier tracking system 106 may then store information describing a many-to-many relationship between the plurality of identifiers and a plurality of physical item types. Alternatively, the stored information may comprise a many-to-one relationship between a plurality of identifiers and a single type of physical item.

Identifier tracking system 106 may maintain information related to associations between shipped products and identification tags. This may include storing and retrieving associations between identifiers stored on identification tags 100 and one or more products 104.

In response to obtaining the identifier of an identification tag, such as one of identification tags 100, information indicative of an identifier and a product to which the identifier was affixed may be transmitted to identifier tracking system 106. In the case of a bulk read operation, the information may be indicative of a range of identifiers and a product associated with at least one of the range.

Identifier tracking system 106 may store the association between a product and an identifier. An association between a product and an identifier may comprise an association between a product type and the identifier. An association between a product and an identifier may also comprise an association between a specific instance of the product and the identifier. For example, an association might indicate that identifier "X123456" is associated with a product "A" that was manufactured by "Y." The association might also indicate that identifier "X123456" is associated with the product "A" that was manufactured by "Y," having serial number "XYZ 545454." Various associations of this type may be recorded. In an embodiment, an association may be stored between an identifier and a universal product code ("UPC"). In another, an association may be stored between an identifier, a UPC, and a serial number of a specific product instance.

A product may be shipped from distribution center 102 to a consumer, which might, for example, be user 118. A user 118 might receive a delivered product 114. Upon proximity of delivered product 114 to a mobile computing device 116, a reader device included in mobile computing device 116 might read the identifier stored in an identification tag affixed to delivered product 114. This might occur, for example, as a result of an electromagnetic signal emanating from the reader device included in mobile computing device 116 and causing an induction effect to be read by the included reader device, allowing the identifier to be read.

A mobile computing device 116 might transmit the identifier via network 120 to identifier tracking system 106. The identifier might contain information indicating the identity of user 118. In various embodiments, additional information, such as geographic location, date, time, and user profile information, might also be transmitted, in various combinations.

Embodiments may store information indicative of the association between the user, the identifier, and the delivered product. Identifier tracking system 106 may store the association, as well as perform various retrieval functions for utilizing the associations. The identifier tracking system 106 may also maintain additional associations, such as between the identifier and the geographic location, date, time, and user profile information.

A digital application store 108 may receive information indicating that a reader device included in mobile computing device 116 has been brought into proximity of delivered product 114. In response, digital application store 108 may cause mobile computing device 116 to display a user interface customized based on an association between the user 118, the delivered product 114, and the identifier.

Figure 2A:
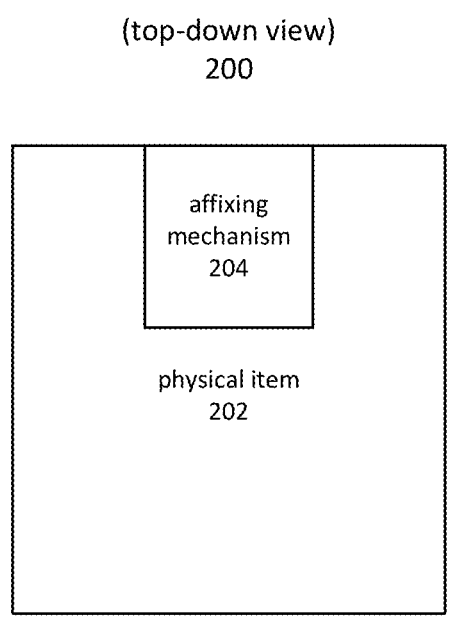
FIG. 2A is a block diagram depicting an example of a physical item configured to receive an identification tag.

FIG. 2A is a block diagram depicting an example of a physical item configured to receive an identification tag. For illustrative purposes, a top-down view 200 is provided. However, it will be appreciated that numerous other alternative configurations are possible, and are included within the scope of the present disclosure.

As depicted in FIG. 2A, a physical item 202 may include an affixing mechanism 204. The affixing mechanism 204 may be a raised slot configured to accept an identification tag (not shown). The slot may be mounted on the surface of physical item 202. In some embodiments, the slot may include a locking mechanism to secure the identification tag once inserted. In some embodiments, an adhesive mechanism may be utilized within the slot, or a magnetic mechanism. In another embodiment, affixing mechanism 204 may comprise a prepared surface for accepting an adhesive.

Figure 2B:
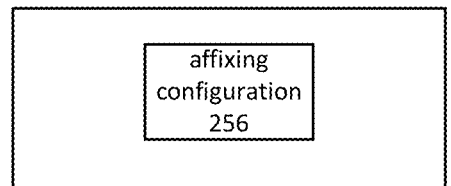
FIG. 2B is a block diagram depicting an additional example of a physical item configured to receive an identification tag.
Figure 2B:
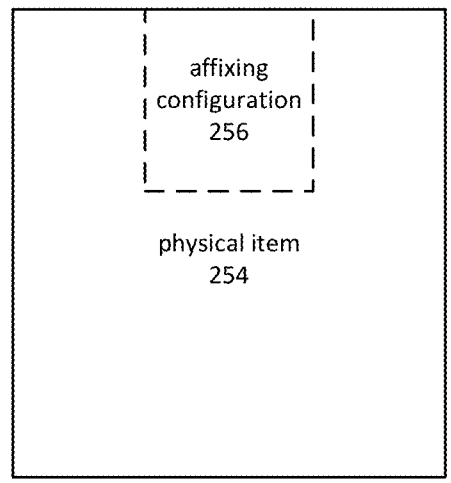

In an embodiment, physical item 202 may comprise a coin-shaped physical item. In another embodiment, physical item 202 may comprise a physical item shaped like a gift-card or credit card. In another embodiment, physical item 202 may comprise a greeting card. The preceding examples are intended to be non-limiting examples, and should not be viewed as limiting the scope of the present disclosure. In addition, these and other examples may further be applied to physical item 254, as depicted in FIG. 2B, which is a block diagram depicting an additional example of a physical item configured to receive an identification tag (not shown). From a side view 250 or top-down view 252 of physical item 254, it may be seen that physical item 254 may include an affixing configuration 256, which might, for example, comprise a slot protruding into the interior of physical item 254. The affixing configuration 256 may be shaped to accept and retain an identification tag. A door, lever, or other locking mechanism may be employed to retain the identification tag. Various adhesive or magnetic retention mechanisms may also be employed.

Identification tags may be pre-programmed with a serial number and affixed to a product at a distribution center or warehouse. During a shipping process, a product with the identification tag affixed may be scanned to obtain the serial number, and then an association between the product and the identifier may be recorded.

Figure 3A:
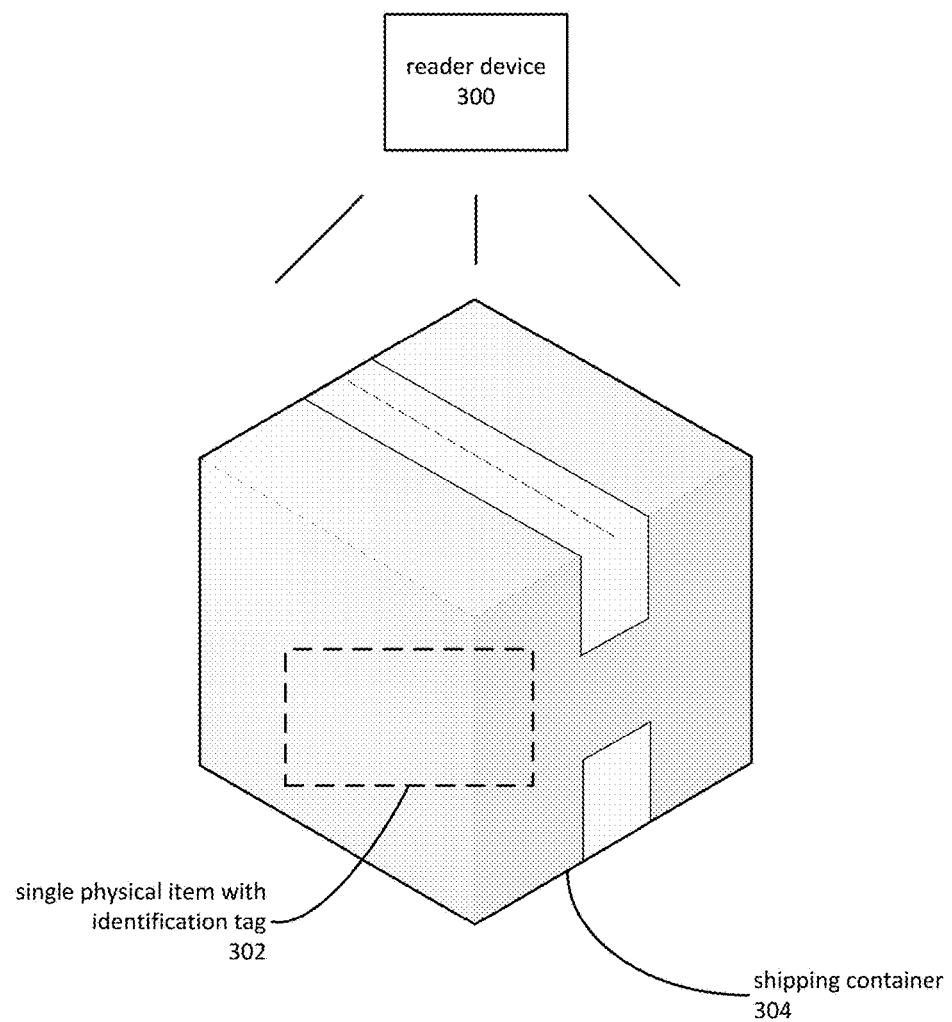
FIG. 3A is a block diagram depicting an example of a scanning process for an individual identification tag during shipping.

In some cases, scanning may occur after a product has been packaged for shipment. FIG. 3A is a block diagram depicting an example of a scanning process for an individual identification tag during shipping. A reader device 300 may scan a shipping container 304 after an identification tag has been affixed to a physical item, depicted in FIG. 3A as physical item 302. The physical item 302 may be the sole product included in shipping container 304. In various cases, shipping container 304 may be the original packaging of the product. The shipping container 304 may in such cases be combined at a later time into a larger shipping container with other products. A reader device 300 may scan physical item 302 while it is within a shipping container 304.

Figure 3B:
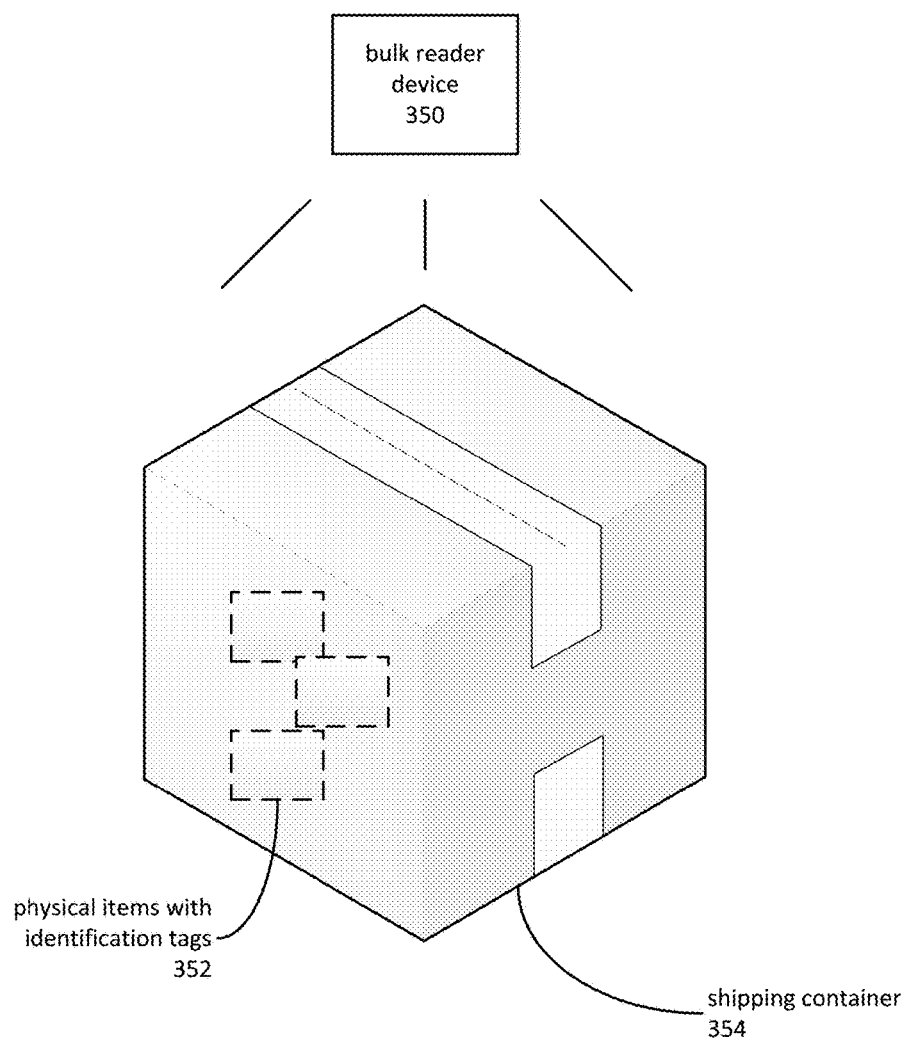
FIG. 3B is a block diagram depicting an example of a scanning process for a plurality of identification tags within a shipping container.

FIG. 3B is a block diagram depicting an example of a scanning process for a plurality of identification tags within a shipping container. In some cases, a process for shipping products and scanning may be such that scanning for identification codes may occur after a product with an affixed identification tag has been packaged for shipment. As depicted in FIG. 3B, a number of physical items 352 may be contained within a shipping container 354. A bulk reader device 350 may read the identifiers stored on product tags contained within shipping container 354. Because there are a number of physical items 352 in shipping container 354, it may not in all cases be possible to obtain a one-to-one correspondence between a product contained within shipping container 354 and an identifier. If only a single item within shipping container 354 is known to be affixed with an identification tag, it may be possible to determine a one-to-one relationship through deduction. However, in some cases multiple physical items 352 may be affixed with identification tags. It may be the case that a range of identifiers are associated with certain product types, in which case a one-to-one correspondence between the product and the identifier may be established. In other cases and embodiments, a many-to-one or many-to-many relationship may be recorded. For example, a range of identifiers "101" to "105" might be associated with five or more products contained within shipping container 354.

Figure 4A:
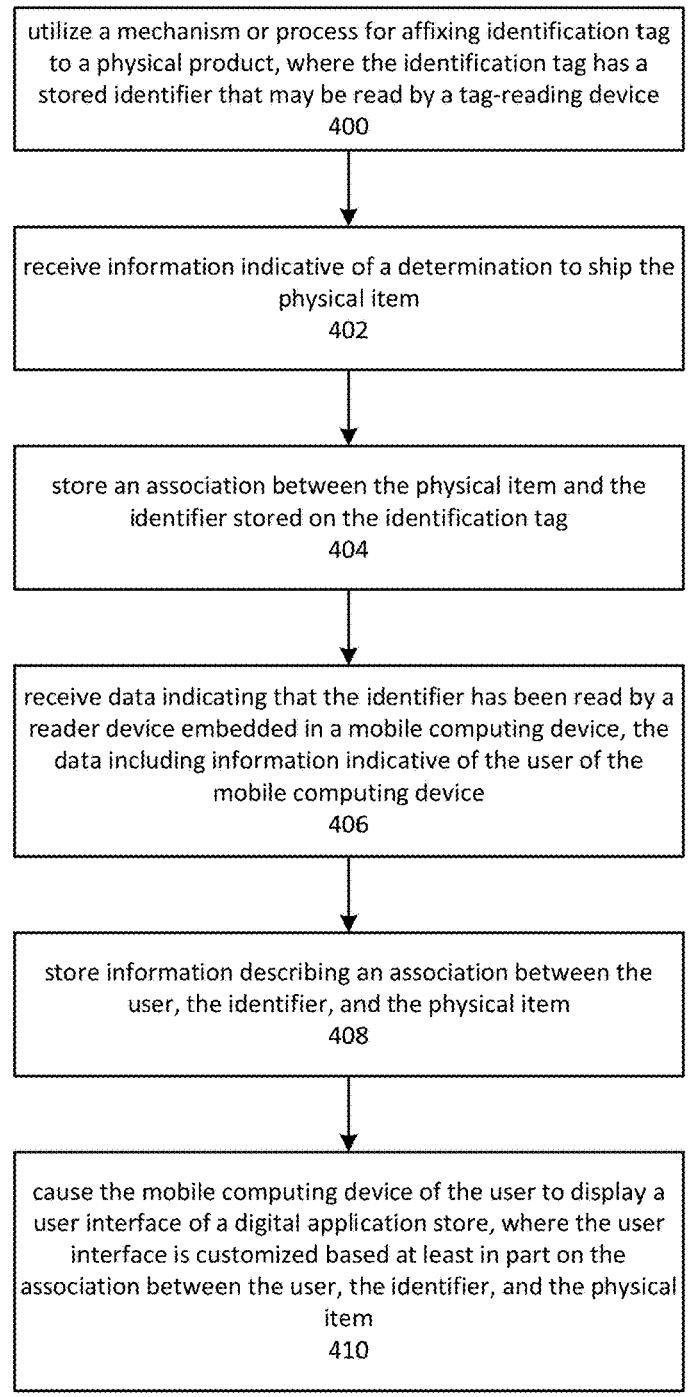
FIG. 4A is a flowchart depicting a process for linking a physical item shipped from a distribution facility to a digital application store.

FIG. 4A is a flowchart depicting a process for linking a physical item shipped from a distribution facility to a digital application store. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

Element 400 depicts an embodiment utilizing a mechanism or process for affixing identification tag to a physical item, where the identification tag has a stored identifier that may be read by a tag-reading device. In some instances, a manual or machine-automated process may be employed in order to affix an identification tag to a physical item being prepared for shipment. In some cases, tags may be affixed to the product during a manufacturing operation or at some point prior to the arrival of the product at a distribution center.

Information about the identifier affixed to a physical item may be established at or during the process of affixing the identification tag to the product. The corresponding identifier may at this point be known, or may be readable by a scan of the identifier performed prior to affixing the tag to the product. In some embodiments of the process depicted by FIG. 4A, the identifier may be read after the corresponding identification tag has been affixed to the product. Moreover, in some cases, the read may be performed after the product has been packaged, including some cases where the product may have been packaged with additional products. The present disclosure describes various techniques applicable to these cases.

Element 402 depicts an embodiment determining or receiving information indicative of a determination to ship the physical item. Element 404 depicts storing an association between the physical item and the identifier stored on the identification tag. An association between an identifier encoded on an identification tag affixed to the physical item may be stored in response to the determination to ship the physical item. Additional information may be stored so that the identifier is associated with information, such as the intended recipient, other products shipped with the physical item, and so on.

Element 406 depicts an embodiment receiving data indicating that the identifier has been read by a reader device embedded in a mobile computing device, the data including information indicative of the user of the mobile computing device. This may occur in a variety of scenarios.

In one scenario, a recipient of the packaged physical item may remove the physical item from its packaging, and then bring the physical item into proximity with a mobile computing device that has an embedded identification tag reader device.

In another scenario, the recipient might bring the package containing the physical item into proximity with the mobile computing device.

In another scenario, the physical item is transferred to a user of a mobile computing device with an included identification tag reader device. The user of the mobile computing device might be someone other than the recipient of the package. This could occur when the physical item is intended as a gift from the recipient to the user of the mobile computing device. It might also occur when the recipient is a retail establishment, and the physical item is provided or sold to the user of the mobile computing device, who brings the mobile computing device into proximity with the physical item.

Element 408 depicts an embodiment storing information describing an association between the user, the identifier, and the physical item. Information corresponding to the identity of the user of the mobile computing device may be transmitted to an identifier tracking facility or to a digital application store. The information may be transmitted as part of a request to display a user interface associated with the application store. Element 410 depicts an embodiment causing the mobile computing device of the user to display a user interface of a digital application store, where the user interface is customized based at least in part on the association between the user, the identifier, and the physical item. The mobile computing device may transmit a request comprising the identifier and information corresponding to the identity of the user. The application store may then request information indicative of a relationship between the identifier and the physical item. This may be further refined into associations with brand names, categories of products, and so on. Based on this information, the digital application store may send rendering information to the mobile computing device, which in turn may cause the mobile computing device to display a customized user interface of a digital application store.

Figure 4B:
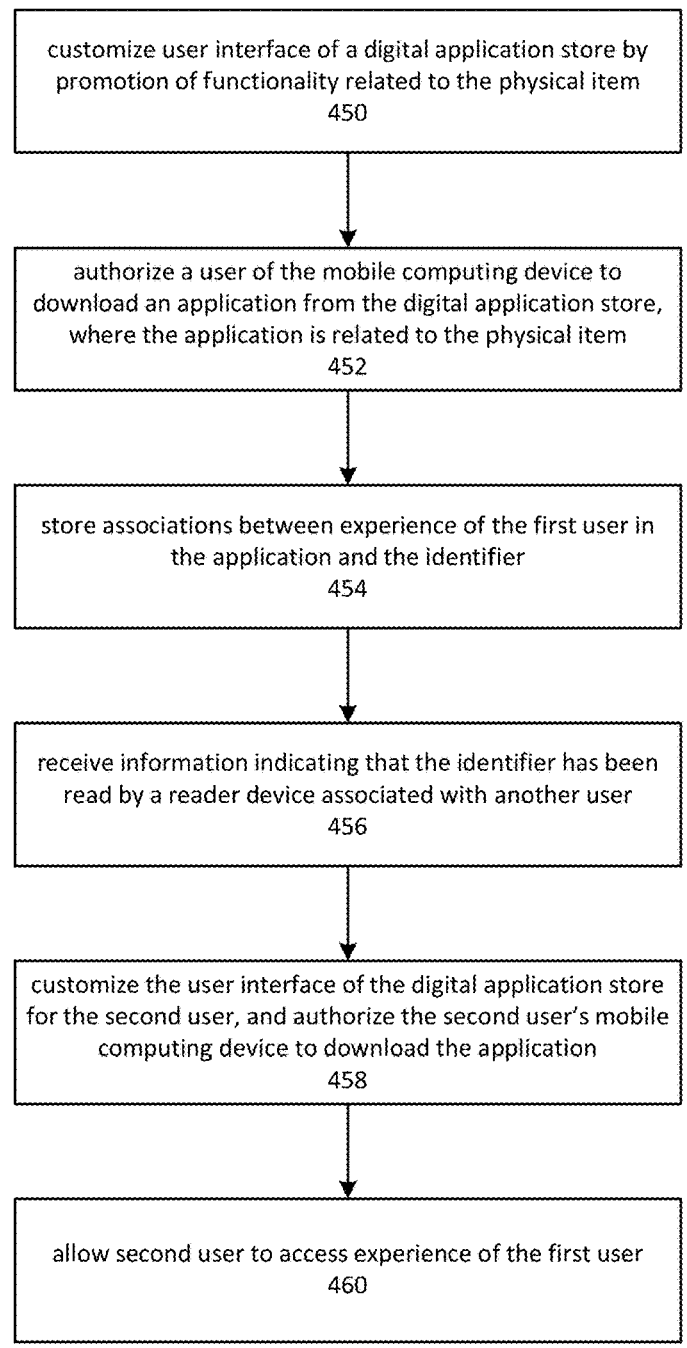
FIG. 4B is a flowchart depicting a process for customizing a digital application store based on a link between a physical item and the digital application store.

FIG. 4B is a flowchart depicting a process for customizing a digital application store based on a link between a physical item and the digital application store. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

Element 450 depicts an embodiment customizing the user interface of a digital application store by promotion of functionality related to the physical item. For example, information might be displayed in the user interface that pertains to the physical item whose identifier was read. In some cases, it might pertain to the specific instance of the physical item.

A user's account with the digital application store may also be modified. This may include modifying the user's account with the digital application store to reflect acquisition of the physical item. For example, a user might be authorized to download an application that supplements the functioning of the physical item in some way. Element 452 depicts an embodiment authorizing a user of the mobile computing device to download an application from the digital application store, where the application is related to the physical item.

A user's account might also be credited with a certain amount in order to offset the cost of future purchases from the digital application store. In some cases, credits related to a customer reward system or point system might be awarded to the user.

Element 454 depicts an embodiment storing associations between experience of the first user in the application and the identifier. As used herein, the term "experience" may relate to a variety of factors related to the operation of an application. These factors might include credits or points associated with the first user, game levels completed by the first user, recordings of game experiences, saved application files, photographs, or other digital assets, and so on.

Element 456 depicts an embodiment receiving information indicating that the identifier has been read by a reader device associated with another user. The second user, for example, might have been given the physical item by the first user. The second user might then bring the physical item within proximity to a second mobile computing device with an included identification tag reader. The identification tag might then be transmitted to one of an identifier tracking system accompanied with information indicative of the identity of the second user.

Element 458 depicts an embodiment customizing the user interface of the digital application store for the second user, and authorize the second user's mobile computing device to download the application. The digital application store might be modified in a manner similar to those described above regarding modifications for the first user. In some cases and embodiments, further modifications may be made in order to provide information related to the transfer of possession of the physical item from the first user to the second user.

Element 460 depicts an embodiment allowing the second user to access some portion of the experience of the first user in the application downloaded and used by the first user. For example, credits associated with the first user's account might be transferred to the second user's account. In another embodiment, game levels completed by the first user might be made available to the second user. In another embodiment, recordings or other media files might be made available to the second user.

In one embodiment, the current possessor of a physical object might be provided with a display indicative of shared experiences for an application associated with the identifier. For example, a coin object might be affixed with an identification tag. When passed from a first user to a second user, both users might be provided access to content related to the application.

In an embodiment, aspects of a system, method, or computer program product may comprise storing an association between the identifier and a physical item shipped to a recipient. Information may be received that indicates the identifier was read by a reader device embedded in a mobile computing device. The information may include data pertaining to the identity a first user, and may also include the identifier read by the reader device.

The system, method, or computer program product may involve storing information indicative of an interaction by the first user with a digital goods store, or products provided by a digital goods store, such as applications or media files.

A second set of information may be received indicating that the identifier was read by a reader device embedded in a second mobile computing device. The information may describe the identity of a second user and may also include the identifier read by the reader embedded in the second mobile computing device.

Interaction with a digital goods store, or with products associated with a digital goods store, may be customized based on interactions between the first user and the digital goods store, or the products associated with it. For example, a media file might correspond to a digital book, a movie, or a music album. A first user's interactions with the book might comprise marking favorite passages of the book, favorite scenes from the movie, or favorite songs on the album. Upon transfer of the physical item from the first user to the second user, data describing the marked portions might be copied to records associated with the second user. When the second user interacts with those items, the interaction may be customized to reflect the marked portions. For example, when an album is played, an associated media player interface might highlight those songs marked as favorites by the first user, so that the second user is made aware of the first user's marking.

In another aspect, the second user may be authorized to access an application or media file from the digital goods store based on previous interactions involving the first user. For example, the favorite songs of the first user might be automatically made available to the second user. In some cases, the second user may be granted authorization to access an application or media file that may remain authorized to the first user. In other cases, the authorization may be transferred from the first user to the second user, so that the authorization is revoked from the first user and provided to the second user. The copy or transfer of the authorization may occur in response to receiving data that indicates the identifier was read by a reader device embedded in the second user's mobile computing device.

In another aspect, an entitlement may be added to the first user's account in response to the identifier being read by a reader device embedded in the second user's mobile computing device. It might be the case that an original provider of the physical item, such as a manufacturer or retail-level recipient of the item, might wish to encourage sharing or reuse of the physical item. In such cases, a user who shares or enables reuse of the physical item by another user might be rewarded in some way. The entitlement might include store credits, authorization to download or use an application or media file, and so on.

Figure 5:
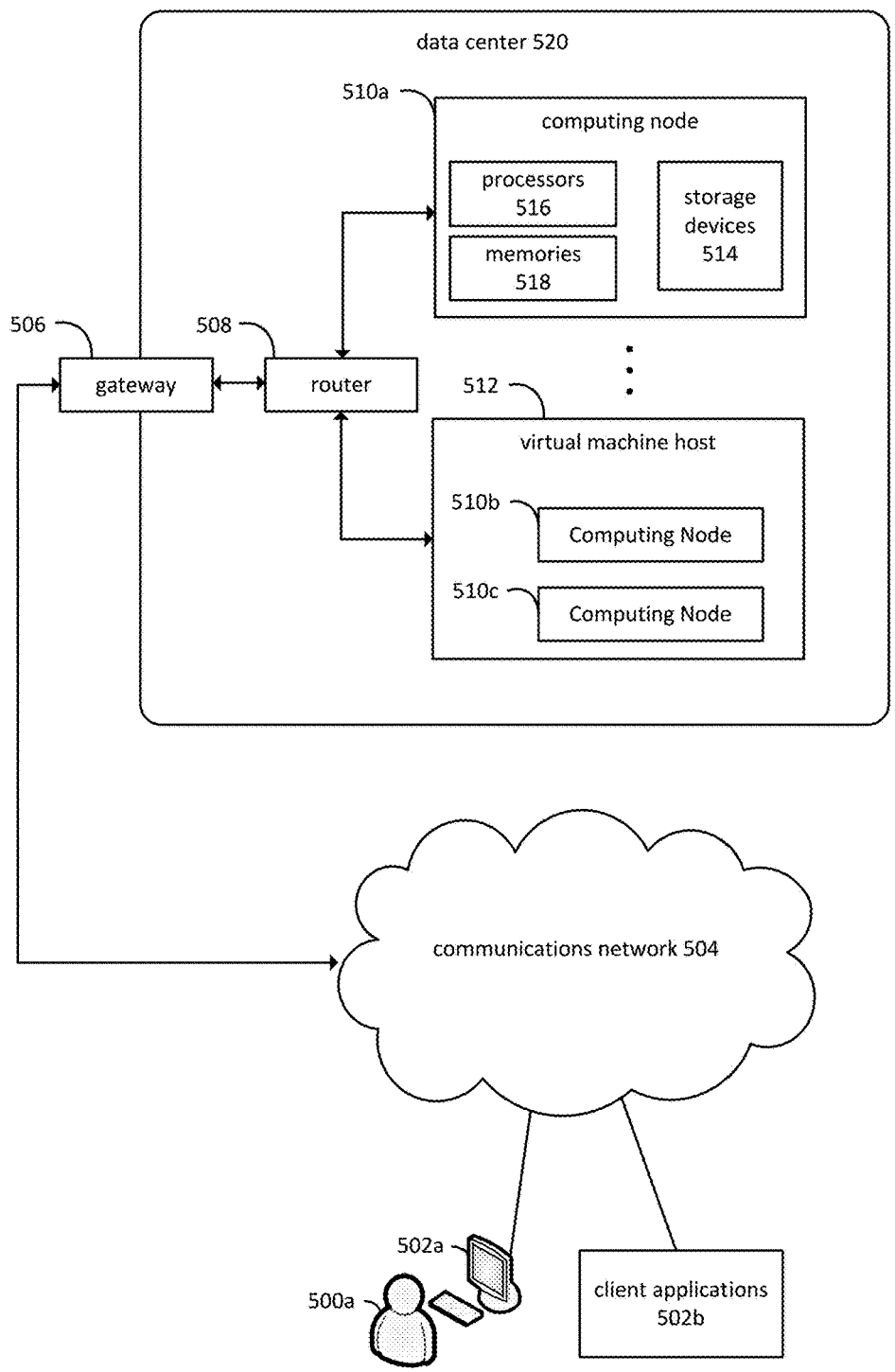
FIG. 5 is a block diagram depicting an embodiment of a computing environment in which aspects of the present disclosure may be practiced.

FIG. 5 is a diagram depicting an example of a distributed computing environment on which aspects of the present invention may be practiced. Various users 500a may interact with various client applications, operating on any type of computing device 502a, to communicate over communications network 504 with processes executing on various computing nodes 510a, 510b, and 510c within a data center 520. Alternatively, client applications 502b may communicate without user intervention. Communications network 504 may comprise any combination of communications technology, including the Internet, wired and wireless local area networks, fiber optic networks, satellite communications, and so forth. Any number of networking protocols may be employed.

Communication with processes executing on the computing nodes 510a, 510b, and 510c, operating within data center 520, may be provided via gateway 506 and router 508. Numerous other network configurations may also be employed. Although not explicitly depicted in FIG. 5, various authentication mechanisms, web service layers, business objects, or other intermediate layers may be provided to mediate communication with the processes executing on computing nodes 510a, 510b, and 510c. Some of these intermediate layers may themselves comprise processes executing on one or more of the computing nodes. Computing nodes 510a, 510b, and 510c, and processes executing thereon, may also communicate with each other via router 508. Alternatively, separate communication paths may be employed. In some embodiments, data center 520 may be configured to communicate with additional data centers, such that the computing nodes and processes executing thereon may communicate with computing nodes and processes operating within other data centers.

Computing node 510a is depicted as residing on physical hardware comprising one or more processors 516, one or more memories 518, and one or more storage devices 514. Processes on computing node 510a may execute in conjunction with an operating system or alternatively may execute as a bare-metal process that directly interacts with physical resources, such as processors 516, memories 518, or storage devices 514.

Computing nodes 510b and 510c are depicted as operating on virtual machine host 512, which may provide shared access to various physical resources, such as physical processors, memory, and storage devices. Any number of virtualization mechanisms might be employed to host the computing nodes.

The various computing nodes depicted in FIG. 5 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 6:
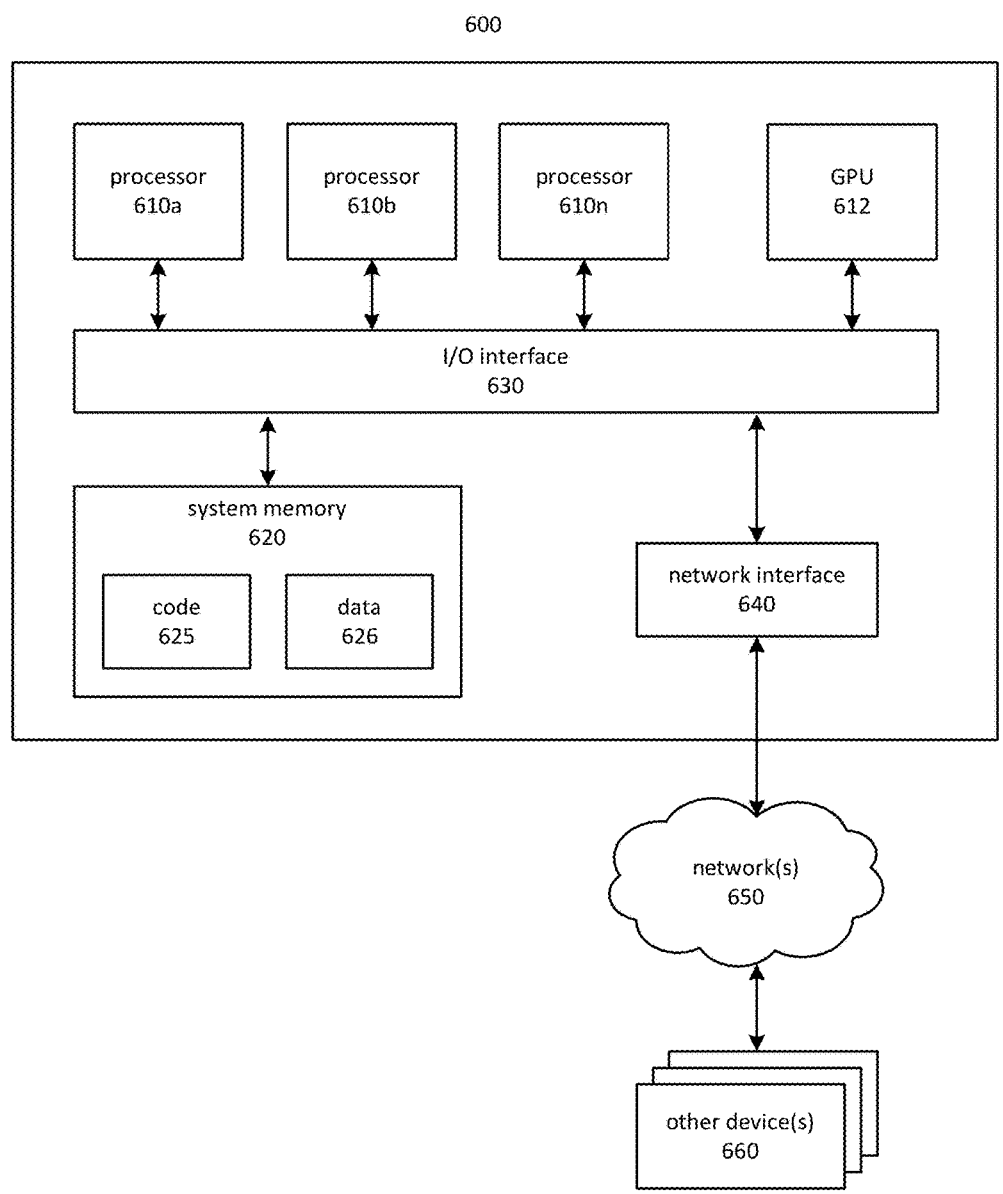
FIG. 6 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 6 depicts a general-purpose computer system that includes or is configured to access one or more computer-accessible media. In the illustrated embodiment, computing device 600 includes one or more processors 610a, 610b, and/or 610n (which may be referred herein singularly as a processor 610 or in the plural as the processors 610) coupled to a system memory 620 via an input/output ("I/O") interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures ("ISAs"), such as the x86, PowerPC, SPARC or MIPS ISAs, or any other suitable ISA. In multiprocessor systems, each of processors 610 may commonly, but not necessarily, implement the same ISA.

In some embodiments, a graphics processing unit ("GPU") 612 may participate in providing graphics rendering and/or physics processing capabilities. A GPU may, for example, comprise a highly parallelized processor architecture specialized for graphical computations. In some embodiments, processors 610 and GPU 612 may be implemented as one or more of the same type of device.

System memory 620 may be configured to store instructions and data accessible by processor(s) 610. In various embodiments, system memory 620 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 620 as code 625 and data 626.

In one embodiment, I/O interface 630 may be configured to coordinate I/O traffic between processor 610, system memory 620, and any peripherals in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect ("PCI") bus standard or the Universal Serial Bus ("USB") standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or networks 650, such as other computer systems or devices, for example. In various embodiments, network interface 640 may support communication via any suitable wired or wireless general data networks, such as types of Ethernet networks, for example. Additionally, network interface 640 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 620 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 600 as system memory 620 or another type of memory. Further, a computer-accessible medium may include transmission media or signals, such as electrical, electromagnetic or digital signals, conveyed via a communication medium, such as a network and/or a wireless link, such as those that may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for linking a physical item to a digital goods store, the system comprising:
    one or more computing nodes;
    a mechanism that, when activated, causes an identification tag to be affixed to the physical item, the identification tag having stored thereon an identifier; and
    one or more memories having stored thereon computer-readable instructions that, upon execution by the one or more computing nodes, cause the system at least to:
        store a first association between the identifier and the physical item;
        receive a first data indicative of the identifier having been read by a first reader device embedded in a first mobile computing device of a first user, the data comprising the identifier and information indicative of the first user;
        store information indicative of interaction by the first user with at least one of the digital goods store, an application obtained from the digital goods store, or a media file obtained from the digital goods store;
        receive a second data indicative of the identifier having been read by a second reader device embedded in a second mobile computing device of a second user, the second data comprising the identifier and the information indicative of the second user; and
        customize interaction of the second user with at least one of the digital goods store, an application obtained from the digital goods store, or a media file obtained from the digital goods store, wherein the interaction of the second user is customized based at least in part on the information indicative of interaction by the first user.

2. The system of claim 1, wherein the interaction of the second user is further customized based at least in part on determining the first association between the physical item and the identifier.

3. The system of claim 1, further comprising one or more memories having stored thereon computer-readable instructions that, upon execution by the one or more computing nodes, cause the system at least to:
    authorize the second user to access at least one of an application or a media file from the digital goods store based at least in part on the information indicative of interaction by the first user.

4. The system of claim 1, further comprising one or more memories having stored thereon computer-readable instructions that, upon execution by the one or more computing nodes, cause the system at least to:
    transfer authorization to access at least one of an application or a media file from the first user to the second user, in response to receiving the second data indicative of the identifier having been read by the reader device embedded in the second mobile computing device of the second user.

5. The system of claim 1, further comprising one or more memories having stored thereon computer-readable instructions that, upon execution by the one or more computing nodes, cause the system at least to:
    store an additional association between the identifier and a recipient of the physical item; and
    customize a user interface of the digital goods store based at least in part on the additional association between the identifier and the recipient.

6. A method of improving functioning of a digital goods store by linking a physical item to the digital goods store, the method comprising:
    storing a first association between an identifier and the physical item, the identifier stored on an identification tag affixed to the physical item;
    receiving a first data comprising the identifier and information indicative of a first user of a first mobile computing device, the identifier read from the identification tag;
    storing information indicative of interaction by the first user with at least one of the digital goods store, an application obtained from the digital goods store, or a media file obtained from the digital goods store;
    receiving a second data comprising the identifier and the information indicative of a second user of a second mobile computing device, the identifier read from the identification tag; and
    customizing interaction of the second user with at least one of the digital goods store, an application obtained from the digital goods store, or a media file obtained from the digital goods store, wherein the interaction of the second user is customized based at least in part on the information indicative of interaction by the first user.

7. The method of claim 6, wherein the interaction of the second user is further customized based at least in part on determining the first association between the physical item and the identifier.

8. The method of claim 6, further comprising:
    authorizing the second user to access at least one of an application or a media file from the digital goods store based at least in part on the information indicative of interaction by the first user.

9. The method of claim 6, further comprising:
    transferring authorization to access at least one of an application or a media file from the first user to the second user, in response to receiving the second data indicative of the identifier having been read by a reader device embedded in the second mobile computing device of the second user.

10. The method of claim 6, further comprising:
    storing an additional association between the identifier and a recipient of the physical item; and
    customizing a user interface of the digital goods store based at least in part on the additional association between the identifier and the recipient.

11. The method of claim 6, wherein the first association between the identifier and the physical item comprises a many-to-one relationship between a plurality of identifiers and the physical item.

12. The method of claim 6, further comprising:
    adding an entitlement for the first user to the digital goods store in response to receiving the second data.

13. The method of claim 6, further comprising:
    customizing a first experience in the application for the user based at least in part on the association between the first user, the identifier, and the physical item; and customizing a second experience in the application for the second user in response to receiving the second data, wherein the second experience in the application is based at least in part on the first experience in the application for the first user.

14. A non-transitory computer-readable storage medium having stored thereon instructions that, upon execution by one or more computing devices, cause the one or more computing devices at least to:

store a first association between an identifier and a physical item, the identifier stored on an identification tag affixed to the physical item;

receive a first data comprising the identifier and information indicative of a first user of a first mobile computing device, the identifier read from the identification tag;

store information indicative of interaction by the first user with at least one of a digital goods store, an application obtained from the digital goods store, or a media file obtained from the digital goods store;

receive a second data comprising the identifier and the information indicative of a second user of a second mobile computing device, the identifier read from the identification tag; and customize interaction of the second user with at least one of the digital goods store, an application obtained from the digital goods store, or a media file obtained from the digital goods store, wherein the interaction of the second user is customized based at least in part on the information indicative of interaction by the first user.

15. The non-transitory computer-readable storage medium of claim 14, wherein the interaction of the second user is further customized based at least in part on determining the first association between the physical item and the identifier.

16. The non-transitory computer-readable storage medium of claim 14, comprising further instructions that, upon execution by the one or more computing devices, cause the one or more computing devices to at least:

authorize the second user to access at least one of an application or a media file from the digital goods store based at least in part on the information indicative of interaction by the first user.

17. The non-transitory computer-readable storage medium of claim 14, comprising further instructions that, upon execution by the one or more computing devices, cause the one or more computing devices to at least:

transfer authorization to access at least one of an application or a media file from the first user to the second user, in response to receiving the second data indicative of the identifier having been read by a reader device embedded in the second mobile computing device of the second user.

18. The non-transitory computer-readable storage medium of claim 14, comprising further instructions that, upon execution by the one or more computing devices, cause the one or more computing devices to at least:

store an additional association between the identifier and a recipient of the physical item; and customize a user interface of the digital goods store based at least in part on the additional association between the identifier and the recipient.

19. The non-transitory computer-readable storage medium of claim 14, comprising further instructions that, upon execution by the one or more computing devices, cause the one or more computing devices to at least:

add an entitlement for the first user to the digital goods store in response to receiving the second data.

20. The non-transitory computer-readable storage medium of claim 14, wherein the identifier corresponds to a product code.

* * * * *